(12) United States Patent
Nakamura et al.

(10) Patent No.: US 8,058,361 B2
(45) Date of Patent: Nov. 15, 2011

(54) POLYMER AND A FILM OR SHEET CONTAINING THE SAME

(75) Inventors: Hirokado Nakamura, Otsu (JP); Hiroshi Shinnumadate, Otsu (JP); Masahiro Kimura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 12/593,567

(22) PCT Filed: Mar. 28, 2008

(86) PCT No.: PCT/JP2008/056098
§ 371 (c)(1),
(2), (4) Date: Sep. 28, 2009

(87) PCT Pub. No.: WO2008/120722
PCT Pub. Date: Oct. 9, 2008

(65) Prior Publication Data
US 2010/0137526 A1    Jun. 3, 2010

(30) Foreign Application Priority Data
Mar. 30, 2007   (JP) ................................. 2007-091090

(51) Int. Cl.
*C08G 59/14* (2006.01)
*C08G 63/06* (2006.01)
*C08L 67/04* (2006.01)

(52) U.S. Cl. ........................................ 525/450; 528/365

(58) Field of Classification Search ........................ None
See application file for complete search history.

(56) References Cited

U.S. PATENT DOCUMENTS 5,498,650 A * 3/1996 Flexman et al. .............. 524/114
2002/0160201 A1 * 10/2002 Ohkura et al. ................ 428/413

FOREIGN PATENT DOCUMENTS

| JP | 11-116785 A | | 4/1999 |
| JP | 11-116785 A | * | 4/1999 |
| JP | 2003-002921 | | 8/2003 |
| JP | 2000-44659 A | | 2/2006 |
| JP | 2006-77126 A | | 3/2006 |
| JP | 2007-302718 A | | 11/2007 |
| WO | WO-2006/059606 A1 | | 6/2006 |

* cited by examiner

*Primary Examiner* — Robert Sellers
(74) *Attorney, Agent, or Firm* — Birch, Stewart, Kolasch & Birch, LLP

(57) ABSTRACT

Provided is a polymer prepared by using a vegetable oil-derived component and favorably used as a polylactic acid resin-softening agent that is effective in softening the polylactic acid resin while preserving the transparency of the polylactic acid resin and simultaneously resistant to bleeding out (extraction) of itself from the polylactic acid resin. Also provided are a resin mixture of the resin composition and a polylactic acid resin as well as a film or sheet prepared by using the resin mixture.

The polymer (C) according to the present invention has an epoxidized vegetable oil segment (A) and a polylactic acid segment (B). The resin mixture according to the present invention is a mixture of the polymer (C) and the polylactic acid resin (D) at a (C)/(D) ratio of 10/90 to 50/50 (weight ratio).

7 Claims, No Drawings

POLYMER AND A FILM OR SHEET CONTAINING THE SAME

TECHNICAL FIELD

The present invention relates to a polymer prepared by using a vegetable oil-derived component that is favorable as a polylactic acid resin-softening agent and a film or sheet of a resin mixture comprising the polymer and a polylactic acid resin.

BACKGROUND ART

Recently, such as in plastic waste treatment problem and environmental problem, it is prompted intensive studies for application of polylactic acid resins that is prepared from a vegetable-derived raw material and superior in biodegradability widely as a general-purpose polymer. There are many studies conducted on polylactic acid resin compositions. However, the polylactic acid resin is generally a hard and brittle polymer. For that reason, for use of the homopolymer as it is as a general-purpose polymer in various applications, there are many problems left in individual applications.

In particular, when the polylactic acid resin is to be used as processed into film or sheet, hardness and brittleness of the resin causes a big problem. Various studies are in progress to solve the problem. In particular, widely known are a softening method by addition of a plasticizer such as polyethylene glycol and a method of overcoming brittleness for example by addition of an aliphatic polyester. Combined use of these methods permitted wider use of the polylactic acid. However, the polyethylene glycol, which is used as plasticizer, causes a concern about adverse effect on environment. In addition, there is also a problem that addition of an aliphatic polyester makes the resulting polylactic acid resin opaque.

In addition to the resin modification methods, newly proposed were methods of changing the additive used in the polylactic acid resin to a low-environmental-load material such as vegetable oil-derived component or natural oil-derived component (Patent Documents 1 to 3). These methods are lower in environmental load than traditional methods and improved the heat resistance and the shock resistance of the polylactic acid resin. However, these methods are not those for softening or for prevention of bleeding out (extraction). In these methods, only a vegetable oil-derived component or a natural oil-derived component is blended with the polylactic acid resin. Accordingly, the polylactic acid resin, when processed into film or sheet, does not have a function to prevent bleeding out (extraction) sufficiently.

Patent Document 1: JP-A No. 11-116785
Patent Document 2: JP-A No. 2003-002921
Patent Document 3: JP-A No. 2006-077126

SUMMARY OF THE INVENTION

Problems to be Solved by the Invention

An object of the present invention, which was made to solve the problems above, is to provide a polymer that can be used favorably as a polylactic acid resin-softening agent prepared by using a vegetable oil-derived component, being possible to soften the polylactic acid resin while preserving the transparency of the polylactic acid resin, and being simultaneously resistant to bleeding out (extraction) from the polylactic acid resin.

Another object of the present invention is to provide a film or sheet prepared by using a resin mixture of the polymer and the polylactic acid resin.

Means to Solve the Problems

After intensive studies to solve the problems above, the inventors have found a polymer having the following characteristics (1) and (2) and made the present invention. Specifically, the present invention has the following characteristics:
(1) The polymer (C) according to the present invention has an epoxidized vegetable oil segment (A) and a polylactic acid segment (B); and
(2) The resin mixture according to the present invention is a mixture of the polymer (C) and the polylactic acid resin (D) at a (C)/(D) ratio of 10/90 to 50/50 (weight ratio).

Advantageous Effect of the Invention

The polymer according to the present invention is prepared by using a vegetable oil-derived component having an epoxidized vegetable oil segment (A) and an polylactic acid segment (B). The polymer can be used favorably as a polylactic acid resin-softening agent that softens the polylactic acid resin while preserving the transparency of the polylactic acid resin, and is simultaneously resistant to bleeding out (extraction) from the polylactic acid resin.

In addition, the film or sheet prepared by using a resin mixture of the polymer and the polylactic acid resin is superior in flexibility, transparency, bleed out resistance, and steam-blocking efficiency. It can be molded and processed, similarly to conventional resins and thus, can be used in various applications.

DESCRIPTION OF THE PREFERRED EMBODIMENTS

Hereinafter, the present invention will be described in detail.
[Polymer (C)]
The polymer (C) according to the present invention contains an epoxidized vegetable oil segment (A) and a polylactic acid segment (B).
(Epoxidized Vegetable Oil Segment (A))
The epoxidized vegetable oil segment (A) for use in the present invention is an oil prepared by epoxidation of the unsaturated bonds in unsaturated fatty acids present in a vegetable oil. The epoxidation is carried out by a known method.

The vegetable oil that may be used is not particularly limited, and may be known drying oil, semi-drying oil, non-drying oil and other vegetable oil. Typical examples thereof include linseed oil, castor oil, soy bean oil, hemp oil, cone oil, benne oil, sunflower oil, safflower oil, rape-seed oil, peanut oil, olive oil, palm oil, palm oil, camellia oil and the like.

The epoxidized vegetable oil segment (A) is superior in stability and also easier in storage. It is often added as a stabilizer, for example, to wrap films that become in contact with foods, and is higher in safety and readily available. In particular, for preservation of transparency, an epoxidized vegetable oil segment (A) favorably compatible with the polylactic acid resin (D) and having a refractive index close to that of the polylactic acid resin (D) is preferable. Specifically, epoxidized derivatives of linseed oil, castor oil and soy bean oil are used favorably, and epoxidized linseed oils based on linseed oil are used particularly favorably.

(Polylactic Acid Segment (B))

The polylactic acid segment (B) for use in the present invention preferably has a number-average molecular weight of 100 or more and 3000 or less. A polylactic acid segment having a number-average molecular weight of 100 or less may be less effective in compatibility with polylactic acids and resistance to bleeding out (extraction), while that having a number-average molecular weight of more than 3000 may be insufficient in softening efficiency. In particular, for further prevention of bleeding out (extraction), a number-average molecular weight of 500 or more and 3000 or less is preferable. Alternatively for more favorable expression of the softening efficiency and the resistance to bleeding out (extraction) simultaneously, a number-average molecular weight of 500 or more and 2000 or less is preferable.

The optical purity of the polylactic acid segment (B) is not particularly limited, but an optical purity of 95% or more is preferable, because the polymer (C) becomes easier in handling after solidification by crystallization and forms eutectic crystal with the polylactic acid resin (D), as will be described below, making it highly resistant to bleeding out.

The polymer (C) according to the present invention is obtained by reacting the epoxidized vegetable oil segment (A) with the polylactic acid segment (B).

The polymer (C) according to the present invention had a structure represented by the following Chemical Formula (1) or (2).

[Formula 1]

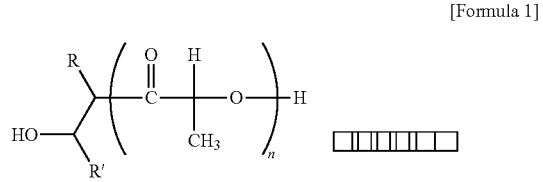

In the Formula, R and R' each represent an alkyl group derived from the epoxidized vegetable oil (A).

[Formula 2]

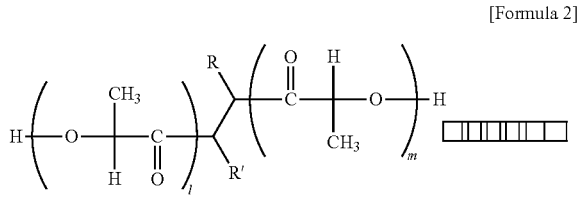

In the Formula, R and R' each represent an alkyl group derived from the epoxidized vegetable oil (A).

The polymer (C) according to the present invention is prepared in any way, if the structure represented by the Chemical Formulae can be obtained. The polylactic acid segment (B) may be prepared, for example, by ring-opening of the epoxy groups in the epoxidized vegetable oil segment for example with acid and water and subsequent ring-opening polymerization of the generated terminal OH groups with a lactide or by direct polymerization of lactic acid, but the production method is not limited thereto.

The number-average molecular weight of the polylactic acid segment (B) can be determined, for example, by the following method: First, the molecular weight of the polymer (C) is determined, for example, by GC-MS, $^1$H-NMR, or GPC, and the polylactic acid segment (B) region therein is hydrolyzed, for example, with alkali. The epoxidized vegetable oil segment (A) component and lactic acid generated by hydrolysis of the polylactic acid segment (B) are separated by using good and poor solvents, giving the isolated epoxidized vegetable oil segment (A) component. The molecular weight of the isolated epoxidized vegetable oil segment (A) is determined, for example, by $^1$H-NMR, $^{13}$C-NMR or GPC, subtraction thereof from the molecular weight of the polymer (C) gives the molecular weight of the original polylactic acid segment.

The polymer (C) may contain additives such as vegetable oils, epoxidized vegetable oil segments, polyethers, antioxidants, catalyst inactivators, and terminal-blocking agents, in the range that does not impair the advantageous effects of the invention. Examples of the antioxidants include hindered phenols, hindered amines and the like, and examples of the catalyst inactivators include phosphoric acid compounds, alkyl phosphonate compounds, amine acetates and the like. Examples of the terminal-blocking agents include carbodiimide compounds, epoxy compounds and isocyanate compounds.

The polymer (C) according to the present invention has actions to soften polylactic acid, prevent bleeding out, and preserve transparency. In addition, because all constituent components are vegetable-derived components, the polymer is used favorably as a polylactic acid-softening agent lower in environment load.

[Resin Mixture]

The resin mixture according to the present invention is a mixture of the polymer (C) and the polylactic acid resin (D). It is possible, by adding the polymer (C) according to the present invention to the polylactic acid resin (D), to obtain a resin mixture (E) in which the polylactic acid resin (D) is softened and the bleeding out of the polymer (C) from the polylactic acid resin (D) is suppressed, and the transparency of the polylactic acid resin (D) is preserved.

The polylactic acid resin (D) for use in the resin mixture according to the present invention is a biodegradable polylactic acid resin prepared from a natural raw material derived from a vegetable such as corn. The polylactic acid resin for use in the present invention may be a lactic acid homopolymer, a lactic acid copolymer or the blend polymer thereof. The molar ratio (L/D) of L-lactic acid unit to D-lactic acid unit in the polylactic acid resin may be in the range of 100/0 to 0/100, but either the L- or D-lactic acid unit is preferably contained in an amount of 90 mol % or more for larger crystal fusion heat. The polylactic acid resin may contain other components as well.

The polylactic acid resin for use in the present invention can be prepared by a known method. Typical examples thereof include a two-phase lactide method of preparing a cyclic dimer, such as L-lactide, D-lactide or D,L-lactide, by using L- or D-lactic acid as raw material and then polymerizing the lactide by ring-opening polymerization with a metal catalyst such as tin 2-ethylhexanoate, a one-phase direct polymerization method of carrying out direct dehydration condensation of the raw material in solvent, and the like, and any production process may be used.

The polymer (C) and the polylactic acid resin (D) can be mixed at any rate in the range of (C)/(D)=10/90 to 50/50 (weight ratio). Mixing at the rate gives a resin mixture (E) superior in transparency, softening efficiency, and resistance to bleeding out (extraction). In particular, mixing at a rate in the range of 20/80 to 50/50 (weight ratio) is preferable for improvement in resistance to bleeding out and transparency. Further, mixing at a rate in the range of 30/70 to 40/60 (weight ratio) is preferable for maximum expression of the actions such as softening. When the mixing rate of the polymer (C) is less than 10 (weight ratio), it may be difficult to obtain sufficient softening efficiency. On the other hand, when the mixing rate of the polymer (C) is more than 50 (weight ratio), it may lead to deterioration in processability by decrease in viscosity and also in mechanical properties.

The molecular weight of the polylactic acid resin (D) is not particularly limited, but a high-molecular weight polymer having a number-average molecular weight of more than 50,000 is preferable, because it is possible to obtain a resin mixture (E) superior in processability and mechanical properties. The number-average molecular weight is more preferably 70,000 or more.

Examples of the methods of mixing the polymer (C) with the polylactic acid resin (D) include a method of extruding a polymer (C) previously dried under heat and reduced pressure and a polylactic acid (D) previously dried by a similar method in a biaxial or uniaxial extruder in the molten state, a method of extruding them in a tightly-sealed heated container equipped with a stirring blade in the molten state, or a method of preparing a polymer (C) for example in a container, then adding a polylactic acid (D) previously dried under heat and reduced pressure into the container and blending the mixture, and the like.

The resin mixture according to the present invention (E) can be molded by various methods such as extrusion molding, injection molding, inflation molding, lamination molding and press molding. Preferably, the resin mixture according to the present invention (E) can be molded by using existing apparatuses used for general-purpose resins.

[Film or Sheet]

The resin mixture (E) containing the polymer (C) and the polylactic acid resin (D) can be used favorably in the form of film or sheet. In the present invention, the film is a sheet-shaped product having a thickness of 100 µm or less, while the sheet is a sheet-shaped product having a thickness of more than 100 µm and 2000 µm or less. The thickness of the film or sheet formed from the resin mixture (E) is not particularly limited, but it is preferable to form a sheet-shaped product having a thickness of 10 µm or more and 500 µm or less, because the softening efficiency of the polymer (C) is more distinct when the thickness is in the range of 10 µm or more and 500 µm or less. If the transparency is emphasized, a thickness of 10 µm or more and 100 µm or less is preferable. Alternatively for tackiness as of food-wrapping films, a thickness of 10 µm or more and 20 µm or less is preferable. Because the tackiness for example of wrap films is associated with the degree of adhesion to the object, a film having a thickness in the range above exhibits improved shape compatibility and tackiness.

Examples of the methods of molding the resin mixture (E) obtained from the polymer (C) and the polylactic acid resin (D) into film or sheet include a method obtaining a film or sheet by casting the mixture through a T-shaped die onto a cooled metal roll and drawing the resulting film arbitrarily, a method of extruding a resin through a circular die and expanding the film by internal air pressure, a method of dissolving the mixture in a volatile organic solvent, forming a thin film thereof and then vaporizing the solvent, and the like.

The crystal fusion heat of the film or sheet obtained is preferably 5 J/g or more and 30 J/g or less. That having a crystal fusion heat of 5 J/g or less may be insufficient in crystallinity and have poor heat resistance, while that having a crystal fusion heat of 30 J/g or more may have insufficient softening efficiency. For improvement both in heat resistance and softening efficiency, a crystal fusion heat of 5 J/g or more and 20 J/g or less is preferable.

A film having a crystal fusion heat in such a range can be prepared, for example, by controlling of the crystallinity or annealing of the resin mixture (E).

The control of the crystallinity of resin mixture (E) means controlling of the optical purity of the polylactic acid resin (D) and the polylactic acid segment (B) to be mixed. Specifically, the optical purity of the polylactic acid resin (D) and the polylactic acid segment (B) is preferably 90% or more, more preferably 93% or more, as a whole. If high crystal fusion heat is desirable, the optical purity is preferably 95% or more.

There are D and L optical isomers of polylactic acid. For improvement in bleed out resistance by co-crystallization of the polylactic acid resin (D) and the polylactic acid segment (B), the polylactic acid resin (D) and the polylactic acid segment (B) are preferably both D isomers or L isomers.

The annealing treatment means a heat treatment during or after casting at a temperature of not lower than the crystallization temperature (Tc) and not higher than the melting point (Tm) of the resin mixture (E). Specifically, the temperature is preferably 50° C. or higher and 120° C. or lower, more preferably 50° C. or higher and 100° C. or lower, and still more preferably 50° C. or higher and 85° C. or lower.

The heat shrinkage of the film or sheet thus obtained is preferably 0.1% or more and 15% or less. A heat shrinkage of more than 15% may lead to drastic shrinkage of the film, occasionally causing problems in handling and storage such as difficulty in withdrawing the film when it is stored as in the roll shape. A heat shrinkage of less than 0.1% may cause practical problems such as separation of the film or sheet from the content when it is used for packaging of materials.

The heat shrinkage can be adjusted in the range above, for example by stretching treatment during film production.

The stretching treatment is a treatment of stretching the film in the machine direction (hereinafter, MD direction) and in the width direction (hereinafter, TD direction) during film formation, and examples thereof include a method of stretching a film in the MD and TD directions stepwise with metal jigs, a method of extruding the resin through a circular die into a tubular shape and stretching the resulting film simultaneously in the MD and TD directions for example by the internally contained air pressure, and the like. In the case of the film or sheet according to the present invention, it is preferably stretched at the same magnitude in the MD and TD directions, and it is preferably stretched 1.5 to 5 times under a typical stretching condition. It is more preferably stretched 2 to 4 times.

The resin mixture (E) or the film or sheet obtained by the present invention does not show change in moisture permeability, in contrast to soft polylactic acid resins containing hydrophilic plasticizers, which are commonly used for softening of polylactic acid, or the moldings thereof. In other words, soft polylactic acid resins containing a hydrophilic plasticizer as polylactic acid-softening agent are more compatible with steam and exhibit greater moisture permeability than homopolymer polylactic acid resins. However, the epoxidized vegetable oil segment (A) used in the present invention is less hydrophilic, and thus, the polymer (C) and also the resin mixture (E) thereof are similar in compatibility with steam to the homopolymer polylactic acid (D) resins, and have a moisture permeability similar to that of the homo-PLA. Although polylactic acids can be softened with an aliphatic polyester, replacing the hydrophilic plasticizer in traditional technology in prior art, these soft polylactic acids and the moldings thereof lose their transparency inherent to the polylactic acids significantly, even though their moisture permeability is unchanged.

Typical moisture permeability and transparency are preferably in the range of 1 {g/(m²×Day)} or more and 30 {g/(m²×Day)} or less, more preferably, 1 {g/(m²×Day)} or more and 25 {g/(m²×Day)} or less, and the haze per 10 μm-thickness is preferably 0.1% or more and less than 1%.

The resin mixture (E) according to the present invention may contain additives such as epoxidized vegetable oils, vegetable oils, polyethers, crystal-nucleating agents, terminal-blocking agents, antioxidants, and ultraviolet stabilizers, as needed, in the range that does not impair the advantageous effects of the invention. Examples of the crystal-nucleating agents include ethylene bisamides, layered silicate salts and the like. Examples of the terminal-blocking agents include carbodiimide compounds, epoxy compounds, isocyanate compounds and the like. Examples of the antioxidants include hindered phenols and hindered amines.

Examples of the application of the films include bags such as litter bag, shopping bag, normal specification bag, and heavy-duty bags; packaging materials for agriculture products, foods, industrial products, fibers and general merchandises; tying tapes; multi and other films for agriculture; and sheets; and alternatively, example of the application of the injection-molding articles include sheets for agriculture, food and industrial products; trays, daily necessities, food containers, protective sheets, seedling pots, industrial materials, industrial products and others.

EXAMPLES

Hereinafter, the present invention will be described more specifically with reference to Examples and Comparative Examples, but it should be understood that the present invention is not limited to the following Examples. Measurement of physical properties and evaluation were made by the following methods:

1. Molecular Weight

A sample was dissolved in THF (tetrahydrofuran) at a concentration of 1 mg/ml, and the number-average molecular weight of the sample was determined from the peak retention time in GPC (gel permeation chromatography), with a calibration curve previously prepared by using polystyrene standards with known molecular weights.

[GPC Apparatus]
Instrument: LC-10A series product, manufactured by Shimadzu Corp.
Solvent: THF (for high-performance liquid chromatography)
Detector: RI detector (RID-10A)
Column: Shodex (trade name) KF-806L and KF-804L (respectively, 300 mm×8 mmφ) manufactured by Showa Denko K.K., used in series
Column temperature: 30° C.
Flow rate: 1.0 ml/min (online deaeration with He)

The polystyrene standards used for construction of the calibration curve were six kinds of Shodex (trade name) polystyrene standards with Std. Nos.S-3850, S-1190, S-205, S-52.4, S-13.9, and S-1.31. These six standards were dissolved in THF, and the retention times thereof were determined by using the GPC apparatus. Because the number-average molecular weights of these 6 standards were known, the peak retention times and the number-average molecular weights were plotted respectively against the ordinate and the abscissa, and a cubic polynomial calibration curve was constructed and used.

2. Analysis of Composition

Presence of the epoxidized vegetable oil segment (A) and the polylactic acid segment (B) was analyzed by using a $^1$H-NMR (nuclear magnetic resonance) apparatus. Bonding between the polylactic acid segment and the epoxy group was determined by the peaks respectively derived from them.

When the sample has a molecular weight of not larger than the detection region of the GPC column, the molecular weight of the polylactic acid segment (B) was determined from the integrated peak intensity obtained by NMR.

3. Softness (Elastic Modulus)

Each of the films obtained in Examples and Comparative Examples was cut to a length of 15 mm in the machine direction and 10 mm in the width direction, and the test piece was subjected to a tensile test according to JIS K7161 and JIS K7127 under the condition of an initial length of 50 mm and a stress rate of 300 mm/minute under an atmosphere at a temperature of 23° C. and a humidity of 63% RH by using a universal Tensilon meter UTC-100 (Orientec Co., Ltd.). Subsequently, by using the straight line region in the stress-strain curve obtained in the tensile test, the difference in stress between two point on the straight line was divided by the difference in deformation between the same; the test was repeated five times; and the average thus obtained was used as the elastic modulus (MPa).

The elastic modulus thus determined was evaluated according to the following criteria:
☐ (Excellent): less than 650 MPa
○ (Favorable): 650 MPa or more and less than 800 MPa
Δ (Fair): 800 MPa or more and less than 1000 MPa
x (Unfavorable): 1000 MPa or more 4. Amount of Bleeding Out (Weight Reduction Rate)

The weight of each of the films obtained in Examples and Comparative Examples was determined before treatment; it was immersed in distilled water at 90° C. for 30 minutes and then separated and dried at 30° C. and 1333 Pa for 6 hours under reduced pressure; and the weight thereof was determined once again. The weight reduction rate (%) was calculated according to the following Formula:

$$\text{Weight reduction rate (\%)} = \{(\text{Weight before treatment}) - (\text{Weight after treatment})\}/(\text{Weight before treatment}) \times 100$$

The weight reduction rate (%) obtained was evaluated according to the following criteria:
☐ (Excellent): less than 1%
○ (Favorable): 1% or more and less than 3%
x (Unfavorable): 3% or more 5. Transparency (Haze)

Each of the films obtained in Examples and Comparative Examples was cut to a length of 40 mm in the machine direction and 30 mm in the width direction, and the sample was conditioned under an atmosphere at a temperature of 23° C. and a humidity of 65% RH for 24 hours. The haze of the film cut off was determined five times according to HS K 7136 by using a hazemeter HGM-2DP (Suga Test Instrument Co., Ltd.) in an atmosphere at 23° C., and the average was obtained.

The film haze value obtained by the analytical instrument was a value obtained by dividing the scattered light permeation by the total permeation and multiplying it by 100. The film haze value obtained was evaluated according to the following criteria:
☐ (Excellent): less than 0.6%
○ (Favorable): 0.6% or more and less than 0.8%
x (Unfavorable): 0.8% or more 6. Moisture Permeation The moisture permeation was determined by moisture permeation dish method. The opening area of the dish used was 0.002826 m²; 20 ml of purified water was placed in the dish;

each of the films obtained in Examples and Comparative Examples described below was fixed with a special jig onto the dish, as it cover the opening. Then, the entire weight (M0 (unit: g)) was determined on an electronic balance and the sample was transferred into a refrigerator at 5° C. and left there for 24 hours. The sample was then separated from the refrigerator and wiped with a dry cloth for removal of water droplets, and the weight (M1 (unit: g)) was determined. The moisture permeation {g/(m²×day)} was calculated according to the following Formula:

Moisture permeation {g/(m²×day)}=(M0−M1)/ 0.002826

The moisture permeation obtained was evaluated according to the following criteria:
☐ (Excellent): less than 20 {g/(m²×day)}
Δ (Fair): 20 {g/(m²×day)} or more 7. Heat Shrinkage Each film was cut into a stripe-shaped sample having a length of 150 mm in the MD direction and 10 mm in the TD direction; it is placed in an atmosphere at 23° C. and a humidity of 60% for 30 minutes; two sites separated by 100 mm in the machine direction were marked under the atmosphere; and the distance between them LA was determined by using a linear scale meter. Then, one terminal of the stripe-shaped sample was connected to a special jig, and the other was pulled downward as it was connected to a weight of 3 g. It was then heated in a hot air oven set to 100° C. for 30 minutes, cooled and conditioned in an atmosphere at 23° C. and a humidity of 60% for 1 hour. The distance previously marked was measured by the linear scale meter, and the heat shrinkage was calculated according to the following Formula by using the value LB:

Heat shrinkage (MD)=(LA−LB)/LA×100

Similarly, the heat shrinkage (TD) was determined, while the direction of the stripe-shaped sample was changed from MD to TD, and the average of the heat shrinkage (MD) and the heat shrinkage (TD) was used as the heat shrinkage.

8. Food-Wrapping Test

Each film having a thickness 10 μm was cut to a sample of 20 cm square; it is placed on a table dish having a diameter of 10 cm and a depth of 3 cm that contains 50 ml of purified water, as it covers the top face thereof, and the excess film was bonded to the periphery of the dish. The dish was then heated in a 500-W microwave oven for 2 minutes. The wrapped dish was taken out, cooled and conditioned in an atmosphere at a temperature of 23° C. and a humidity of 60% for 30 minutes, and subjected to the following evaluation.
☐ (Excellent): the film remained pulled on the top face of dish (in the same state as before)
○ (Favorable): the film was elongated by internal vapor pressure and adhered to the bottom of dish by its weight after cooling.
Δ (Fair): the film was separated from the dish or not covering the top face of dish by breakage.

9. Crystal Fusion Heat

The crystal fusion heat was determined by using a differential scanning calorimeter (RDC220, manufactured by Seiko Instruments Inc.). The heat of endothermic peak observed at a temperature higher than the heat by crystallization, when 5 mg of a sample was heated from 20° C. to 200° C. at a programmed heating rate of 20° C./minute, was used as the crystal fusion heat.

10. Heat Resistance

A film cast to a thickness of 10 μm was cut to a sample of 20 cm square; it was place on a glass cup having a diameter of 6 cm and a height of 8 cm; the edge of the film was fixed with a circular ring rubber; and the cup was conditioned at a temperature of 23° C. and a humidity of 60% for 30 minutes. It was then placed in a hot air oven previously set to a particular temperature for 5 minutes, cooled and conditioned in an atmosphere at 23° C. and a humidity of 60%. The heat resistance of the film was evaluated at a hot-air-oven temperature at which the films did not melt and was removable, according to the following criteria:
☐ (Excellent): 100° C. or higher
○ (Favorable): 90° C. or higher and lower than 100° C.
Δ (Fair): 70° C. or higher and lower than 90° C.
x (Unfavorable): lower than 70° C.

Example 1

1030 g of an epoxidized linseed oil (A) (manufactured by Kitamura Chemicals) was placed in a three-necked flask, and 90 g of L-lactic acid (manufactured by Wako Pure Chemical Industries) was added thereto; and the mixture was agitated by using a mantle heater and a stirrer at 160° C. for 2 hours. 1010 g of L-lactide (B) was added thereto, and the atmosphere was substituted with nitrogen gas. After solubilization of the lactide, 1.1 g of tin 2-ethylhexanoate (II) was added.

The mixture was then stirred for 4 hours under nitrogen environment at 180° C., allowing progress of the reaction. The product was taken out from the flask, to give a semi-solid polymer (C).

Analysis of $^1$H-NMR and $^{13}$C-NMR of the polymer (C) obtained showed peaks derived from bonds of the epoxidized vegetable oil segment and the polylactic acid segment.

Subsequently, a resin mixture (E) was prepared from the polymer (C) and the polylactic acid (D) by the following method, and a film was formed with the mixture.

The polymer (C) and the polylactic acid (D) were made available at a polymer (C) to polylactic acid (D) ratio by weight of 40/60, with respect to 100 parts by weight of the total of the polymer (C) and the polylactic acid (D).

The polylactic acid (D) used was a mixed polylactic acid having an optical purity of 91%, a mixture of an amorphous polylactic acid having an optical purity of 88% and a number-average molecular weight of 120,000 and a crystalline polylactic acid having an optical purity of 98% and a number-average molecular weight 110,000 at a ratio of 7:3. The optical purity of the resin mixture (E) thus obtained was 93%.

The polymer (C) and the polylactic acid (D) were dehydrated under the following condition:
Polymer (C): stored in an environment at temperature 40° C. under a vacuum of 1333 Pa for 3 hours.
Polylactic acid (D): stored under an environment at a temperature of 110° C. and a vacuum of 1333 Pa for 3 hours.

The dry polymer (C) and the dry polylactic acid (D) were blended at the weight rate above and fed into a biaxial extruder, melt-blended therein at 170 to 220° C., and extruded out of a die having a straight-line slit onto a cast drum at 20° C. for cooling and solidification, to give an undrawn film. The undrawn film was then stretched three times uniformly, respectively in the film machine direction (MD) and in the direction perpendicular thereto (traverse direction, TD), while the two terminal regions thereof was held by special jigs as the film is conveyed in an oven heated at a temperature of 80 to 110° C., to give a stretched film having a thickness of 10 μm.

Example 2

1030 g of an epoxidized linseed oil (A) (manufactured by Kitamura Chemicals) was placed in a three-necked flask; 90 g of L-lactic acid (manufactured by Wako Pure Chemical Industries) was added thereto; and the mixture was agitated by using a mantle heater and a stirrer at 160° C. for 2 hours. 101 g of L-lactide (B) was added thereto, and the atmosphere was substituted with nitrogen gas. After solubilization of the lactide, 1.1 g of tin 2-ethylhexanoate (II) was added.

The mixture was then stirred for 4 hours under nitrogen environment at 180° C., allowing progress of the reaction. The product was taken out from the flask, to give a semi-solid polymer (C).

Analysis of $^1$H-NMR and $^{13}$C-NMR of the polymer (C) obtained showed peaks derived from bonds of the epoxidized vegetable oil segment and the polylactic acid segment were observed.

Then, a resin mixture (E) was prepared from the polymer (C) and the polylactic acid (D) by the following method, and a film was formed with the mixture.

The polymer (C) and the polylactic acid (D) were made available at a polymer (C) to polylactic acid (D) ratio by weight of 40/60, with respect to 100 parts by weight of the total of the polymer (C) and the polylactic acid (D).

The polylactic acid (D) used was a polylactic acid having an optical purity of 93% and a number-average molecular weight of 120,000.

The polymer (C) and the polylactic acid (D) was dehydrated and the resins were cast, to give a film having a thickness of 10 μm under a condition similar to that in Example 1.

Example 3

1030 g of an epoxidized linseed oil (A) (manufactured by Kitamura Chemicals) was placed in a three-necked flask; 90 g of L-lactic acid (manufactured by Wako Pure Chemical Industries) was added thereto; and the mixture was agitated by using a mantle heater and a stirrer at 160° C. for 2 hours; 3030 g of L-lactide (B) was added thereto, and the atmosphere was substituted with nitrogen gas. After solubilization of the lactide, 1.1 g of tin 2-ethylhexanoate (II) was added.

The mixture was then stirred for 4 hours under nitrogen environment at 180° C., allowing progress of the reaction. The product was taken out from the flask, to give a semi-solid polymer (C).

Analysis of the polymer (C) obtained by $^1$H-NMR and $^{13}$C-NMR showed peaks derived from bonds of the epoxidized vegetable oil segment and the polylactic acid segment were observed.

Then, a resin mixture (E) was prepared from the polymer (C) and the polylactic acid (D) by the following method, and a film was farmed with the mixture.

The polymer (C) and the polylactic acid (D) were made available at a polymer (C) to polylactic acid (D) ratio by weight of 40/60, with respect to 100 parts by weight of the total of the polymer (C) and the polylactic acid (D).

The polylactic acid (D) used was an amorphous polylactic acid having an optical purity of 90% and a number-average molecular weight of 120,000. The optical purity of the resin mixture thus obtained was 93%.

The polymer (C) and the polylactic acid (D) was dehydrated and the resins were cast, to give a film having a thickness of 10 μm under a condition similar to that in Example 1.

Example 4

980 g of an epoxidized soy bean oil (A) was placed in a three-necked flask; 90 g of L-lactic acid (manufactured by Wako Pure Chemical Industries) was added thereto; and the mixture was agitated by using a mantle heater and a stirrer at 160° C. for 2 hours; 1010 g of L-lactide (B) was then added thereto, and the atmosphere was substituted with nitrogen gas. After solubilization of the lactide, 1.1 g of tin 2-ethylhexanoate (II) was added.

The mixture was then stirred for 4 hours under nitrogen environment at 180° C., allowing progress of the reaction. The product was taken off from the flask, to give a semi-solid polymer (C).

Analysis of the polymer (C) obtained by $^1$H-NMR and $^{13}$C-NMR showed peaks derived from bonds of the epoxidized vegetable oil segment and the polylactic acid segment were observed.

Then, a resin mixture (E) was prepared from the polymer (C) and the polylactic acid (D) by the following method, and a film was formed with the mixture.

The polymer (C) and the polylactic acid (D) were made available at a polymer (C) to polylactic acid (D) ratio by weight of 40/60, with respect to 100 parts by weight of the total of the polymer (C) and the polylactic acid (D).

The polylactic acid (D) used was a mixed polylactic acid having an optical purity of 91%, a mixture of an amorphous polylactic acid having an optical purity of 88% and a number-average molecular weight of 120,000 and a crystalline polylactic acid having an optical purity of 98% and a number-average molecular weight of 110,000 at a ratio of 7:3. The optical purity of the resin mixture (E) thus obtained was 93%.

The polymer (C) and the polylactic acid (D) were dehydrated and the resins were cast, to give a film having a thickness of 10 μm under a condition similar to that in Example 1.

Example 5

990 g of an epoxidized castor oil (A) was placed in a three-necked flask; 90 g of L-lactic acid (manufactured by Wako Pure Chemical Industries) was added thereto; and the mixture was agitated by using a mantle heater and a stirrer at 160° C. for 2 hours; 1010 g of L-lactide (B) was added thereto, and the atmosphere was substituted with nitrogen gas. After solubilization of the lactide, 1.77 g of tin 2-ethylhexanoate (II) was added thereto.

The mixture was then stirred for 4 hours under nitrogen environment at 180° C., allowing progress of the reaction. The produced was taken out from the flask, to give a semi-solid polymer (C).

Analysis of the polymer (C) obtained by $^1$H-NMR and $^{13}$C-NMR showed peaks derived from bonds of the epoxidized vegetable oil segment and the polylactic acid segment were observed.

Then, a resin mixture (E) was prepared from the polymer (C) and the polylactic acid (D) by the following method, and a film was formed with the mixture.

The polymer (C) and the polylactic acid (D) were made available at a polymer (C) to polylactic acid (D) ratio by weight of 40/60, with respect to 100 parts by weight of the total of the polymer (C) and the polylactic acid (D).

The polylactic acid (D) used a mixed polylactic acid having an optical purity of 91%, a mixture of an amorphous polylactic acid having an optical purity of 88% and a number-average molecular weight of 120,000 and a crystalline polylactic acid having an optical purity of 98% and a number-average molecular weight of 110,000 at a ratio of 7:3. The optical purity of the resin mixture (E) thus obtained was 93%.

The polymer (C) and the polylactic acid (D) were dehydrated and the resins were cast, to give a film having a thickness of 10 μm under a condition similar to that in Example 1.

Example 6

990 g of an epoxidized castor oil (A) was placed in a three-necked flask; 90 g of L-lactic acid (manufactured by Wako Pure Chemical Industries) was added thereto; and the mixture was agitated by using a mantle heater and a stirrer at 160° C. for 2 hours; then, 3550 g of L-lactide (B) was added thereto, and the atmosphere was substituted with nitrogen gas. After solubilization of the lactide, 1.77 g of tin 2-ethylhexanoate (II) was added thereto.

The mixture was then stirred for 4 hours under nitrogen environment at 180° C., allowing progress of the reaction. The product was taken out from the flask, to give a semi-solid polymer (C).

Analysis of the polymer (C) obtained by $^1$H-NMR and $^{13}$C-NMR showed peaks derived from bonds of the epoxidized vegetable oil segment and the polylactic acid segment were observed.

Then, a resin mixture (E) was prepared from the polymer (C) and the polylactic acid (D) by the following method, and a film was formed with the mixture.

The polymer (C) and the polylactic acid (D) were made available at a polymer (C) to polylactic acid (D) ratio by weight of 40/60, with respect to 100 parts by weight of the total of the polymer (C) and the polylactic acid (D).

The polylactic acid (D) used was an amorphous polylactic acid having an optical purity of 90% and a number-average molecular weight of 120,000. The optical purity of the resin mixture thus obtained was 93%.

The polymer (C) and the polylactic acid (D) were dehydrated and the resins were cast, to give a film having a thickness of 10 μm under a condition similar to that in Example 1.

Example 7

990 g of an epoxidized castor oil (A) was placed in a three-necked flask; 90 g of L-lactic acid (manufactured by Wako Pure Chemical Industries) was added thereto; and the mixture was agitated by using a mantle heater and a stirrer at 160° C. for 2 hours; 101 g of L-lactide (B) was then added thereto, and the atmosphere was substituted with nitrogen gas. After solubilization of the lactide, 1.77 g of tin 2-ethylhexanoate (II) was added thereto.

The mixture was then stirred for 4 hours under nitrogen environment at 180° C., allowing progress of the reaction. The product was taken out from the flask, to give a semi-solid polymer (C).

Analysis of the polymer (C) obtained by $^1$H-NMR and $^{13}$C-NMR showed peaks derived from bonds of the epoxidized vegetable oil segment and the polylactic acid segment were observed.

Then, a resin mixture (E) was prepared from the polymer (C) and the polylactic acid (D) by the following method, and a film was formed with the mixture.

The polymer (C) and the polylactic acid (D) were made available at a polymer (C) to polylactic acid (D) ratio by weight of 10/90 with respect to 100 parts by weight of the total of the polymer (C) and the polylactic acid (D).

The polylactic acid (D) used was a polylactic acid having an optical purity of 93% and a number-average molecular weight of 120,000.

The polymer (C) and the polylactic acid (D) were dehydrated and the resins were cast, to give a film having a thickness of 10 μm under a condition similar to that in Example 1.

Example 8

990 g of an epoxidized castor oil (A) was placed in a three-necked flask; 90 g of L-lactic acid (manufactured by Wako Pure Chemical Industries) was added thereto; and the mixture was agitated by using a mantle heater and a stirrer at 160° C. for 2 hours; 101 g of L-lactide (B) was then added thereto, and the atmosphere was substituted with nitrogen gas. After solubilization of the lactide, 1.77 g of tin 2-ethylhexanoate (II) was added thereto.

The mixture was then stirred for 4 hours under nitrogen environment at 180° C., allowing progress of the reaction. The product was taken out from the flask, to give a semi-solid polymer (C).

Analysis of the polymer (C) obtained by $^1$H-NMR and $^{13}$C-NMR showed peaks derived from bonds of the epoxidized vegetable oil segment and the polylactic acid segment were observed.

Then, a resin mixture (E) was prepared from the polymer (C) and the polylactic acid (D) by the following method, and a film was formed with the mixture.

The polymer (C) and the polylactic acid (D) were made available at a polymer (C) to polylactic acid (D) ratio by weight of 50/50 with respect to 100 parts by weight of the total of the polymer (C) and the polylactic acid (D).

The polylactic acid (D) used was a polylactic acid having an optical purity of 93% and a number-average molecular weight of 120,000.

The polymer (C) and the polylactic acid (D) were dehydrated and the resins were cast, to give a film having a thickness of 10 μm under a condition similar to that in Example 1.

Example 9

990 g of an epoxidized castor oil (A) was placed in a three-necked flask; 90 g of L-lactic acid (manufactured by Wako Pure Chemical Industries) was added thereto; and the mixture was agitated by using a mantle heater and a stirrer at 160° C. for 2 hours. 3030 g of L-lactide (B) was then added thereto; and the atmosphere was substituted with nitrogen gas. After solubilization of the lactide, 1.1 g of tin 2-ethylhexanoate (II) was added.

The mixture was then stirred for 4 hours under nitrogen environment at 180° C., allowing progress of the reaction. The product was taken out from the flask, to give a semi-solid polymer (C).

Analysis of the polymer (C) obtained by $^1$H-NMR and $^{13}$C-NMR showed peaks derived from bonds of the epoxidized vegetable oil segment and the polylactic acid segment were observed.

Then, a resin mixture (E) was prepared from the polymer (C) and the polylactic acid (D) by the following method, and a film was formed with the mixture.

The polymer (C) and the polylactic acid (D) were made available at a polymer (C) to polylactic acid (D) ratio by weight of 10/90 with respect to 100 parts by weight of the total of the polymer (C) and the polylactic acid (D).

The polylactic acid (D) used was a polylactic acid having an optical purity of 93% and a number-average molecular weight of 120,000.

The polymer (C) and the polylactic acid (D) were dehydrated and the resins were cast, to give a film having a thickness of 10 μm under a condition similar to that in Example 1.

Example 10

990 g of an epoxidized castor oil (A) was placed in a three-necked flask; 90 g of L-lactic acid (manufactured by Wako Pure Chemical Industries) was added thereto; and the mixture was agitated by using a mantle heater and a stirrer at 160° C. for 2 hours. 3030 g of L-lactide (B) was then added thereto; and the atmosphere was substituted with nitrogen gas. After solubilization of the lactide, 1.77 g of tin 2-ethylhexanoate (II) was added thereto.

The mixture was then stirred for 4 hours under nitrogen environment at 180° C., allowing progress of the reaction. The product was taken out from the flask, to give a semi-solid polymer (C).

Analysis of the polymer (C) obtained by $^1$H-NMR and $^{13}$C-NMR showed peaks derived from bonds of the epoxidized vegetable oil segment and the polylactic acid segment were observed.

Then, a resin mixture (E) was prepared from the polymer (C) and the polylactic acid (D) by the following method, and a film was farmed with the mixture.

The polymer (C) and the polylactic acid (D) were made available at a polymer (C) to polylactic acid (D) ratio by weight of 50/50 with respect to 100 parts by weight of the total of the polymer (C) and the polylactic acid (D).

The polylactic acid (D) used was an amorphous polylactic acid having an optical purity of 88% and a number-average molecular weight of 120,000.

The polymer (C) and the polylactic acid (D) were dehydrated under a condition similar to that in Example 1, and the resins were cast, to give a film having a thickness of 10 μm.

Example 11

A resin mixture (E) was prepared by mixing a polylactic acid (D) having an optical purity of 91% with the polymer (C) obtained in Example 1 at a mixing rate (C)/(D) of 5/95, to give a the resin mixture (E). The resin mixture (E) thus obtained had an optical purity of 91%.

The polymer (C) and the polylactic acid (D) were dehydrated under and the resins were cast, to give a film having a thickness of 10 μm a condition similar to that in Example 1.

Example 12

A resin mixture (E) was prepared by mixing polylactic acid (D) having an optical purity of 91% with the polymer (C) obtained in Example 1 at a mixing rate (C)/(D) of 60/40. The resin mixture (E) thus obtained had an optical purity of 91%.

The polymer (C) and the polylactic acid (D) were dehydrated and the resins were cast, to give a film having a thickness of 10 μm under a condition similar to that in Example 1.

Example 13

A resin mixture (E) was prepared by mixing a polylactic acid (D) having an optical purity of 88% with the polymer (C) obtained in Example 1 at a mixing rate (C)/(D) of 60/40. The resin mixture (E) thus obtained had an optical purity of 88%.

The polymer (C) and the polylactic acid (D) were dehydrated and the resins were cast, to give a film having a thickness of 10 μm under a condition similar to that in Example 1.

Example 14

A resin mixture (E) was prepared by mixing an amorphous polylactic acid (D) having an optical purity of 87% with the polymer (C) obtained in Example 1 at a mixing rate (C)/(D) of 40/60. The resin mixture (E) thus obtained had an optical purity of 90%.

The resin mixture (E) was dried at a temperature of 80° C. and a vacuum of 1333 Pa for 3 hours, fed into a biaxial extruder, melt-blended therein at 170 to 220° C., and extruded through a die having a straight line slit onto a cast drum at 20° C. for cooling and solidification, to give an undrawn film. The undrawn film was then stretched three times uniformly, respectively in the film machine direction (MD) and in the direction perpendicular thereto (traverse direction, TD), while the two terminal regions thereof was held by special jigs as the film was conveyed in an oven heated at a temperature of 80 to 110° C., to give a stretched film having a thickness of 10 μm.

Example 15

A resin mixture (E) was prepared by mixing a crystalline polylactic acid (D) having an optical purity of 93.5% with the polymer (C) obtained in Example 1 at a mixing rate (C)/(D) of 40/60. The resin mixture (E) thus obtained had an optical purity of 95%.

Hereinafter, a film having a thickness of 10 μm was prepared in a manner similar to Example 14.

Example 16

A resin mixture (E) was prepared by mixing a polylactic acid resin (D) having an optical purity of 91% with the polymer (C) obtained in Example 1 at an mixing rate (C)/(D) of 40/60. The resin mixture (E) thus obtained had an optical purity of 93%.

The resin mixture (E) was dried at a temperature of 80° C. and a vacuum of 1333 Pa for 3 hours, fed into a biaxial extruder, melt-blended therein at 170 to 220° C., and extruded through a die having a straight line slit onto a cast drum at 20° C. for cooling and solidification, to give an undrawn film. The undrawn film was then stretched 1.5 times uniformly, respectively in the film machine direction (MD) and in the direction perpendicular thereto (traverse direction, TD), while the two terminal regions thereof was held by special jigs as the film was conveyed in an oven heated at a temperature of 80 to 110° C., to give a stretched film having a thickness of 10 μm.

Example 17

The resin mixture (E) was dried at a temperature of 80° C. and a vacuum of 1333 Pa for 3 hours, fed into a biaxial extruder, melt-blended therein at 170 to 220° C., and extruded through a die having a straight line slit onto a cast drum at 20° C. for cooling and solidification, to give an undrawn film. The undrawn film was then stretched five times uniformly, respectively in the film machine direction (MD) and in the direction perpendicular thereto (traverse direction, TD), while the two terminal regions thereof was held by special jigs as the film was conveyed in an oven heated at a temperature of 80 to 110° C., to give a stretched film having a thickness of 10 μm.

Example 18

A resin mixture (E) was prepared by mixing a polylactic acid resin (D) having an optical purity of 85% with the polymer (C) obtained in Example 1 at an mixing rate (C)/(D) of 40/60. The resin mixture (E) thus obtained had an optical purity of 85%.

The resin mixture (E) was dried at a temperature of 80° C. and a vacuum of 1333 Pa for 3 hours, fed into a biaxial extruder, melt-blended therein at 170 to 220° C., and extruded through a die having a straight line slit onto a cast drum at 20° C. for cooling and solidification, to give an undrawn film. The undrawn film was then stretched three times uniformly, respectively in the film machine direction (MD) and in the direction perpendicular thereto (traverse direction, TD), while the two terminal regions thereof was held by special jigs as the film was conveyed in an oven heated at a temperature of 80 to 110° C., to give a stretched film having a thickness of 10

Example 19

A resin mixture (E) was prepared by mixing a polylactic acid resin (D) having an optical purity of 98% with the polymer (C) obtained in Example 1 at an mixing rate (C)/(D) of 40/60. The resin mixture (E) thus obtained had an optical purity of 98%.

The resin mixture (E) was dried at a temperature of 80° C. and a vacuum of 1333 Pa for 3 hours, fed into a biaxial extruder, melt-blended therein at 170 to 220° C., and extruded through a die having a straight line slit onto a cast drum at 20° C. for cooling and solidification, to give an undrawn film. The undrawn film was then stretched three times uniformly, respectively in the film machine direction (MD) and in the direction perpendicular thereto (traverse direction, TD), while the two terminal regions thereof was held by special jigs as the film was conveyed in an oven heated at a temperature of 80 to 110° C., to give a stretched film having a thickness of 10 µm.

Comparative Example 1

990 g of a castor oil ethyleneoxide adduct ("Toxanon AH" manufactured by Sanyo Chemical Industries, molecular weight: approximately 3000) was placed in a three-necked flask and stirred therein by using a mantle heater, a stirrer and an oil rotary vacuum pump at a temperature 140° C. and a vacuum of 10 Ton for 30 minutes. Subsequently, 950 g of L-lactide and 1.0 g of tin 2-ethylhexanoate (II) were added thereto, and the mixture was stirred at 140° C. for 3 hours. The product was then taken out from the flask, to give a polymer (F) of castor oil polyethylene glycol-polylactic acid segment type.

Analysis of the composition obtained by $^1$H-NMR and GPC measurement showed that the product had a structure containing three polyethylene glycol units having a molecular weight of 1000 and three polylactic acid segments having a molecular weight of 1000 bound to the polyethylene glycol chain terminals in a molecule of the castor oil.

Subsequently, a film was prepared by using the polymer (F) obtained and a polylactic acid resin (D) by the method described below.

The composition and the polylactic acid (D) were made available at a ratio of 40 wt %/60 wt % with respect to 100 wt % of the total of the polymer (F) and the polylactic acid (D). The polylactic acid (D) used was a homopolylactic acid containing L-lactic acid in an amount of 91% and having a weight-average molecular weight of 110,000. The polymer (F) had an optical purity of 93%.

The polymer (F) and the polylactic acid (D) were dehydrated under the following condition:
Polymer (F): stored in an environment at a temperature of 40° C. and a vacuum of 1333 Pa for 3 hours
Polylactic acid (D): stored in an environment at a temperature of 110° C. and a vacuum of 1333 Pa for 3 hours The dry polymer (F) and the polylactic acid (D) were blended at the weight ratio above, fed into a biaxial extruder, melt-blended at 170 to 220° C., and extruded through a die having a straight line slit onto a cast drum at 20° C. for cooling and solidification, to give an undrawn film. The undrawn film was then stretched three times uniformly, respectively in the film machine direction (MD) and in the direction perpendicular thereto (traverse direction, TD), while the two terminal regions thereof was held by special jigs as the film was conveyed in an oven heated at a temperature of 80 to 110° C., to give a stretched film having a thickness of 10 µm.

Comparative Example 2

A polylactic acid resin (D) having an optical purity of 93% was dehydrated under the condition of Comparative Example 1, supplied into a biaxial extruder having a liquid inlet port and melt-extruded therein at 170 to 220° C. Toxanon AH was supplied through the liquid inlet port, by using a liquid-feeding pump previously adjusted in flow rate to a Toxanon AH addition amount of 40 wt % according to the discharge rate of the twin screw extruder. The melt-blended resin was extruded through a die having a straight line slit onto a cast drum at 20° C. for cooling and solidification, to give an undrawn film. The undrawn film was then stretched three times uniformly, respectively in the film machine direction (MD) and in the direction perpendicular thereto (traverse direction, TD), while the two terminal regions thereof was held by special jigs as the film was conveyed in an oven heated at a temperature of 80 to 110° C., to give a stretched film having a thickness of 10 µm.

Comparative Example 3

440 g of a castor oil ethyleneoxide adduct ("Toxanon AH", manufactured by Sanyo Chemical Industries, molecular weight: approximately 3000) was placed in a three-necked flask and stirred by using a mantle heater, a stirrer and an oil rotary vacuum pump at a temperature of 140° C. and a vacuum of 10 Torr for 30 minutes. Then, 480 g of L-lactide and 1.0 g of tin 2-ethylhexanoate (II) were added thereto, and the mixture was agitated at 140° C. for 3 hours. The product was then taken out from the flask, to give a polymer (F) of castor oil polyethylene glycol-polylactic acid segment type.

Analysis of the composition obtained by $^1$H-NMR and GPC measurement showed that the product had a structure containing three polyethylene glycol units having a molecular weight of 1000 and three polylactic acid segments having a molecular weight of 1000 bound to the polyethylene glycol chain terminals in a molecule of the castor oil.

A film having a thickness of 10 µm was prepared from the polymer (F) obtained and the polylactic acid resin (D), in a manner similar to Comparative Example 1.

Comparative Example 4

A film was prepared by using the polymer (F) obtained by a method similar to that in Comparative Example 1 and a polylactic acid resin (D) by the method described below.

The composition (F) and the polylactic acid (D) were made available at a ratio of 5 wt %/95 wt %, with respect to 100 wt % of the total of the polymer (F) and the polylactic acid (D). The polylactic acid (D) used was a homopolylactic acid having an optical purity of 93% and having a weight-average molecular weight of 110,000. The polymer (F) had an optical purity of 93%.

The composition and the polylactic acid (D) were dehydrated under the following conditions:
Polymer (F): stored in an environment at a temperature of 40° C. and a vacuum of 1333 Pa for 3 hours
Polylactic acid (D): stored in an environment at a temperature of 110° C. and a vacuum of 1333 Pa for 3 hours The dry composition (F) and the dry polylactic acid (D) were blended at the weight ratio above, fed into a biaxial extruder, melt-blended at 170 to 220° C., and extruded through a die having a straight line slit onto a cast drum at 20° C. for cooling and solidification, to give an undrawn film. The undrawn film was then stretched three times uniformly, respectively in the film machine direction (MD) and in the direction perpendicular thereto (traverse direction, TD), while the two terminal regions thereof was held by special jigs as the film was conveyed in an oven heated at a temperature of 80 to 110° C., to give a stretched film having a thickness of 10 µm.

Comparative Example 5

A film was prepared by using a polymer (F) obtained by a method similar to that in Comparative Example 1 and a polylactic acid resin (D) by the method below.

The composition and the polylactic acid (D) were made available at a ratio of 60 wt %/40 wt % with respect to 100 wt % of the total of the polymer (F) and the polylactic acid (D). The polylactic acid (D) used was a homopolylactic acid having an optical purity of 88% and having a weight-average molecular weight of 110,000. The polymer (F) had an optical purity of 93%.

The polymer (F) and the polylactic acid (D) were dehydrated under the following conditions:
Polymer (F): stored in an environment at a temperature of 40° C. and a vacuum of 1333 Pa for 3 hours
Polylactic acid (D): stored in an environment at a temperature of 110° C. and a vacuum of 1333 Pa for 3 hours The dry composition (F) and the dry polylactic acid (D) were blended at the weight ratio above, fed into a biaxial extruder, melt-blended at 170 to 220° C., and extruded through a die having a straight line slit onto a cast drum at 20° C. for cooling and solidification, to give an undrawn film. The undrawn film was then stretched three times uniformly, respectively in the film machine direction (MD) and in the direction perpendicular thereto (traverse direction, TD), while the two terminal regions thereof was held by special jigs as the film was conveyed in an oven heated at a temperature of 80 to 110° C., to give a stretched film having a thickness of 10 µm.

Comparative Example 6

A film was prepared by using a polylactic acid/diol-dicarboxylic acid copolymer ("Plamate PD-350", manufactured by Dainippon Ink and Chemicals, Inc.) and a polylactic acid resin (D) by the method below.

The composition and the polylactic acid (D) were made available at a ratio of 40 wt %/60 wt %, with respect to 100 wt % of the total of PD-350 and the polylactic acid (D). The polylactic acid (D) used was a homopolylactic acid having an optical purity of 95% and having a weight-average molecular weight of 110,000.

The polylactic acid (D) was dehydrated under the following condition:
Polylactic acid (D): stored in an environment at a temperature of 110° C. and a vacuum of 1333 Pa for 3 hours PD-350 and the polylactic acid (D) were blended at the weight rate above, fed into a biaxial extruder, melt-blended at 170 to 220° C., and extruded through a die having a straight line slit onto a cast drum at 20° C. for cooling and solidification, to give an undrawn film. The undrawn film was then stretched three times uniformly, respectively in the film machine direction (MD) and in the direction perpendicular thereto (traverse direction, TD), while the two terminal regions thereof was held by special jigs as the film was conveyed in an oven heated at a temperature of 80 to 110° C., to give a stretched film having a thickness of 10 µm.

Comparative Example 7

A film was prepared by using a polymer (F) obtained by a method similar to that in Comparative Example 1 and a polylactic acid resin (D) having an optical purity of 80% by the method described below.

The polymer (F) and the polylactic acid (D) were made available at a ratio of 40 wt %/60 wt %, with respect to 100 wt % of the total of the polymer (F) and the polylactic acid (D).

The polymer (F) and the polylactic acid (D) were dehydrated under the following conditions:
Polymer (F): stored in an environment at a temperature of 40° C. and a vacuum of 1333 Pa for 3 hours
Polylactic acid (D): stored in an environment at a temperature of 60° C. and a vacuum of 1333 Pa for 3 hours The dry polymer (F) and the polylactic acid (D) were blended at the weight rate above, fed into a biaxial extruder, melt-blended at 170 to 220° C., and extruded through a die having a straight line slit onto a cast drum at 20° C. for cooling and solidification, to give an undrawn film. The undrawn film was then stretched three times uniformly, respectively in the film machine direction (MD) and in the direction perpendicular thereto (traverse direction, TD), while the two terminal regions thereof was held by special jigs as the film was conveyed in an oven heated at a temperature of 60 to 70° C., to give a stretched film having a thickness of 10 µm.

Comparative Example 8

A film was prepared by using a polymer (F) obtained by a method similar to that in Comparative Example 1 and a polylactic acid resin (D) having an optical purity of 98% by the method below.

The composition and the polylactic acid (D) were made available at a ratio of 40 wt %/60 wt %, with respect to 100 wt % of the total of the polymer (F) and the polylactic acid (D).

The polymer (F) and the polylactic acid (D) were dehydrated under the following conditions:
Polymer (F): stored in an environment at a temperature of 40° C. and a vacuum of 1333 Pa for 3 hours
Polylactic acid (D): stored in an environment at a temperature of 110° C. and a vacuum of 1333 Pa for 3 hours The dry polymer (F) and the dry polylactic acid (D) were blended at the weight rate above, fed into a biaxial extruder, melt-blended at 170 to 220° C., and extruded through a die having a straight line slit onto a cast drum at 20° C. for cooling and solidification, to give an undrawn film. The undrawn film was then stretched three times uniformly, respectively in the film machine direction (MD) and in the direction perpendicular thereto (traverse direction, TD), while the two terminal regions thereof was held by special jigs as the film was conveyed in an oven heated at a temperature of 80 to 110° C., to give a stretched film having a thickness of 10 µm.

Comparative Example 9

A film having a thickness of 10 µm was prepared, while the film was stretched uniformly 1.5 times, compared to its original length, respectively in the machine direction (MD) and in the direction perpendicular thereto (TD) during film production in Comparative Example 1.

Comparative Example 10

A film having a thickness of 10 µm was prepared, as the film was stretched uniformly five times from the original length respectively in the machine direction (MD) and in the direction perpendicular thereto (TD) during casting in Comparative Example 1.

The results on the components, the component ratio, the softness, the bleeding out amount, the transparency and the moisture permeation of the resin composition of Examples 1 to 10 and Comparative Examples 1 to 6 are summarized in Tables 1 and 2, and the results on the crystal fusion heat, the resin-mixture (E) optical purity, the heat shrinkage, the wrapping test, the stretching magnification, the heat resistance, and the elastic modulus of the films obtained from the polymers are summarized in Tables 3 and 4.

TABLE 1

| | | | Example 1 | Example 2 | Example 3 | Example 4 | Example 5 | Example 6 | Example 7 |
|---|---|---|---|---|---|---|---|---|---|
| Polymer (C) | Epoxidized vegetable oil segment (A) | Kind | Epoxidized linseed oil | Epoxidized linseed oil | Epoxidized linseed oil | Epoxidized soy bean oil | Epoxidized castor oil | Epoxidized castor oil | Epoxidized castor oil |
| | Polylactic acid segment (B) | Number-average molecular weight | 1,000 | 100 | 3,000 | 1,000 | 1,000 | 3,500 | 100 |
| | Number-average molecular weight of polymer (C) | Number-average molecular weight | 2,023 | 1,123 | 4,023 | 1,980 | 1,990 | 4,490 | 1,090 |
| | Polylactic acid resin (D) | Optical purity (%) | 91 | 93 | 90 | 91 | 91 | 90 | 93 |
| | Weight ratio in resin mixture (E) | (C):(D) | 40:60 | 40:60 | 40:60 | 40:60 | 40:60 | 40:60 | 10:90 |
| | Softness | MPa | 620 | 400 | 700 | 630 | 640 | 740 | 740 |
| | | Evaluation result | ◉ | ◉ | ○ | ◉ | ◉ | ○ | ○ |
| | Bleeding out amount | % | 0.2 | 2.8 | 0.1 | 0.4 | 0.3 | 0.3 | 0.4 |
| | | Evaluation result | ◉ | ○ | ◉ | ◉ | ◉ | ◉ | ◉ |
| | Transparency | % | 0.3 | 0.4 | 0.2 | 0.3 | 0.4 | 0.3 | 0.5 |
| | | Evaluation result | ◉ | ◉ | ◉ | ◉ | ◉ | ◉ | ◉ |
| | Moisture permeation | g/(m² · day) | 16 | 18 | 16 | 18 | 16 | 17 | 19 |
| | | Evaluation result | ◉ | ◉ | ◉ | ◉ | ◉ | ◉ | ◉ |

| | | | Example 8 | Example 9 | Example 10 | Example 11 | Example 12 | Example 13 |
|---|---|---|---|---|---|---|---|---|
| Polymer (C) | Epoxidized vegetable oil segment (A) | Kind | Epoxidized castor oil | Epoxidized castor oil | Epoxidized castor oil | Epoxidized linseed oil | Epoxidized linseed oil | Epoxidized linseed oil |
| | Polylactic acid segment (B) | Number-average molecular weight | 100 | 3,000 | 3,000 | 1,000 | 1,000 | 1,000 |
| | Number-average molecular weight of polymer (C) | Number-average molecular weight | 1,090 | 3,990 | 3,990 | 2,023 | 2,023 | 2,023 |
| | Polylactic acid resin (D) | Optical purity (%) | 93 | 93 | 88 | 91 | 91 | 88 |
| | Weight ratio in resin mixture (E) | (C):(D) | 50:50 | 10:90 | 50:50 | 5:95 | 60:40 | 60:40 |
| | Softness | MPa | 550 | 795 | 780 | 798 | 580 | 580 |
| | | Evaluation result | ◉ | ○ | ○ | ○ | ◉ | ◉ |
| | Bleeding out amount | % | 2.9 | 0.1 | 0.2 | 0.1 | 0.5 | 1.5 |
| | | Evaluation result | ○ | ◉ | ◉ | ◉ | ○ | ○ |
| | Transparency | % | 0.6 | 0.4 | 0.6 | 0.2 | 0.3 | 0.3 |
| | | Evaluation result | ○ | ◉ | ○ | ◉ | ◉ | ◉ |
| | Moisture permeation | g/(m² · day) | 19 | 16 | 18 | 16 | 16 | 19 |
| | | Evaluation result | ◉ | ◉ | ◉ | ◉ | ◉ | ◉ |

TABLE 2

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Polymer (C) | Epoxidized vegetable oil segment (A) | Kind | Castor oil ethyleneoxide adduct | Castor oil ethyleneoxide adduct | Castor oil ethyleneoxide adduct | Castor oil ethyleneoxide adduct | Castor oil ethyleneoxide adduct | PBSA |
|  | Polylactic acid segment (B) | Number-average molecular weight | 1,000 | 0 | 3,500 | 1,000 | 1,000 | 3500 以上 |
|  | Number-average molecular weight of polymer (C) | Number-average molecular weight | 1,000 | 1,000 | 1,000 | 1,000 | 1,000 | — |
|  | Polylactic acid resin (D) | Optical purity (%) |  |  |  |  |  |  |
|  | Weight ratio in resin mixture (E) | (F):(D) | 40:60 | 40:60 | 40:60 | 5:95 | 60:40 | 40:60 |
|  | Softness | MPa | 620 | 610 | 680 | 1,100 | 450 | 720 |
|  |  | Evaluation result | ⊚ | ⊚ | ○ | X | ⊚ | ○ |
|  | Bleeding out amount | % | 3.0 | 12.0 | 2.0 | 0.2 | 4.5 | 1.3 |
|  |  | Evaluation result | ○ | X | ○ | ⊚ | X | ○ |
|  | Transparency | % | 1.2 | 1.5 | 1.2 | 0.3 | 2.3 | 8.0 |
|  |  | 評価 | X | X | X | ⊚ | X | X |
|  | Moisture permeation | g/(m² · day) | 80 | 80 | 80 | 18 | 120 | 16 |
|  |  | Evaluation result | Δ | Δ | Δ | ⊚ | Δ | ⊚ |

As shown in Table 1, the films of Examples 1 to 3, which was prepared by using a resin composition in combination of an epoxidized linseed oil and a polylactic acid different only in number-average molecular weight were superior both in softness and transparency and lower in moisture permeation, although the film using a polylactic acid segment having a number-average molecular weight of 100 in Example 2 showed slight bleeding out. In addition, the film of Example 3 using a polylactic acid segment having a number-average molecular weight of 3000 was resistant to bleeding out and superior in transparency and moisture permeation, although it was slightly lower in softness.

The film of Example 4, which was prepared by using an epoxidized soy bean oil, replacing the epoxidized linseed oil of Example 1, was resistant to bleeding out, superior both in softness and transparency, and lower in moisture permeation.

The film of Example 5, which was prepared by using an epoxidized castor oil, replacing the epoxidized linseed oil of Example 1, was resistant to bleeding out, superior both in softness and transparency, and lower in moisture permeation.

The film of Example 6, which is identical with the film of Example 5 except that the polylactic acid segment has a number-average molecular weight of 3500, was resistant to bleeding out, superior in transparency and lower in moisture permeation, although the softness was slightly lower.

The films of Examples 7 and 9, in which the blending ratio of the epoxidized castor oil to the polylactic acid segment is 10:90, were resistant to bleeding out, excellent in transparency, and lower in moisture permeation, although the softness was slightly lower, even though the polylactic acid segments respectively had different number-average molecular weights of 100 and 3000.

The film of Example 8, in which the blending ratio of the epoxidized castor oil to the polylactic acid segment was 50:50 and the polylactic acid segment has a number-average molecular weight of 100, caused some bleeding out and was slightly lower in transparency, but was superior in softness and lower in moisture permeation.

The film of Example 10, in which the blending ratio of the epoxidized castor oil to the polylactic acid segment was 50:50 and the polylactic acid segment had a number-average molecular weight of 3000, was slightly inferior in softness and transparency, but resistant to bleeding out and lower in moisture permeation.

The film of Example 11, which is identical with that of Example 1 except that the blending ratio of the polymer (C) is smaller (5:95) than the range of the blending ratio of the present invention, was slightly inferior in softness, but superior in transparency, resistant to bleeding out and lower in moisture permeation.

The film of Example 12, which is identical with that of Example 1 except that the blending ratio of the polymer (C) is larger (60:40) than the range of the blending ratio of the present invention, caused some bleeding out but was superior in softness, excellent in transparency, and lower in moisture permeation.

The film of Example 13, which is identical with that of Example 12 except that the blending ratio of the polymer (C) is the same as that of Example 12 (60:40) and the purity of the polylactic acid resin is lower than that of Example 12, caused bleeding out in a greater amount, compared to the film of Example 12.

The film of Comparative Example 1, which was prepared by using a castor oil ethyleneoxide adduct replacing the epoxidized castor oil, was fairly in softness, but caused slight bleeding out and was inferior in transparency and significantly higher in moisture permeation.

The film of Comparative Example 2, which was prepared by using a castor oil ethyleneoxide adduct replacing the epoxidized castor oil, was fairly in softness, but caused bleeding out and was inferior in transparency and higher significantly in moisture permeation.

The film of Comparative Example 3, which was prepared by using a castor oil ethyleneoxide adduct, replacing the epoxidized castor oil, and a polylactic acid segment having a number-average molecular weight of 3500, was slightly lower in softness, caused some bleeding out, was lower in transparency, and significantly higher in moisture permeation. It was distinctively inferior in bleeding out, transparency and steam permeability to the film of Example 6, which was prepared by using the epoxidized castor oil and a polylactic acid segment having a number-average molecular weight of 3500.

The film of Comparative Example 4, which was prepared by using an ethyleneoxide adduct replacing the epoxidized castor oil castor oil and a polylactic acid segment having a number-average molecular weight of 1000 at a ratio of 5:95, was inferior in softness.

The film of Comparative Example 5, which was prepared by using a castor oil ethyleneoxide adduct replacing the epoxidized castor oil and a polylactic acid segment having a number-average molecular weight of 1000 at a blending ratio of 60:40, was superior in softness, but caused bleeding out and was inferior in transparency and significantly higher in moisture permeation.

The film of Comparative Example 6, which was prepared by using a polylactic acid/diol-dicarboxylic acid copolymer replacing the epoxidized vegetable oil segment and a polylactic acid segment, was slightly inferior in softness, caused some bleeding out, and was inferior in transparency, but was lower in moisture permeation.

The results above indicate that a resin mixture in combination of the polymer according to the present invention and a polylactic acid resin is characteristically resistant to bleeding out, superior both in softness and transparency and lower in moisture permeation.

It also shows that the drawn film of Example 14, which is identical with that of Example 1 except that the polylactic acid in the resin mixture (E) has an optical purity of 90%, has a crystal fusion heat of 5 J/g, and is inferior slightly in heat shrinkage, wrapping test, heat resistance, and elastic modulus, but superior in heat shrinkage, wrapping test, heat resistance, elastic modulus and heat shrinkage to the drawn film of Example 1.

It also shows that the drawn film of Example 15, which is identical with that of Example 1 except that the polylactic acid in the resin mixture (E) has an optical purity of 95%, has a crystal fusion heat of 30 J/g and is superior or equivalent in heat shrinkage, wrapping test, heat resistance and elastic modulus to the drawn film of Example 1.

When the drawn film of Example 16, which was prepared by using the resin mixture (E) containing a polylactic acid having an optical purity of 93% and by annealing and the same drawn film of Example 17 produced without annealing are compared, the annealed drawn film of Example 17 showed lower heat shrinkage.

The drawn film of Example 18, which is identical with that of Example 1 except that the polylactic acid in the resin mixture (E) had an optical purity of 85%, had a crystal fusion

TABLE 3

|  |  | Example 1 | Example 14 | Example 15 | Example 16 | Example 17 | Example 18 | Example 19 |
|---|---|---|---|---|---|---|---|---|
| Crystal fusion heat | J/g | 25 | 5 | 30 | 25 | 25 | 2 | 33 |
| Optical purity of (E) | % | 93 | 90 | 95 | 93 | 93 | 85 | 98 |
| Heat shrinkage | % | 5 | 11 | 2 | 15 | 0.1 | −15 | 0 |
| Wrapping test | Evaluation result | ◎ | ○ | ◎ | ○ | ○ | Δ | Δ |
| Stretching ratio | times | 3 | 3 | 3 | 1.5 | 5 | 3 | 3 |
| Heat resistance | Evaluation result | ◎ | ○ | ◎ | ◎ | ◎ | Δ | ○ |
| Elastic modulus | MPa | 620 | 610 | 625 | 620 | 620 | 615 | 625 |

TABLE 4

|  |  | Comparative Example 1 | Comparative Example 7 | Comparative Example 8 | Comparative Example 9 | Comparative Example 10 |
|---|---|---|---|---|---|---|
| Crystal fusion heat | J/g | 25 | 0 | 33 | 25 | 25 |
| Optical purity of (E) | % | 93 | 85 | 98 | 93 | 93 |
| Heat shrinkage | % | −5 | −20 | 0 | 20 | 0 |
| Wrapping test | Evaluation result | Δ | Δ | Δ | Δ | Δ |
| Stretching ratio | times | 3 | 3 | 3 | 1.5 | 5 |
| Heat resistance | Evaluation result | ○ | X | ○ | X | X |
| Elastic modulus | MPa | 620 | 615 | 625 | 620 | 620 |

Table 3 shows that the drawn film of Example 1, which was prepared by using a resin mixture (E) containing a polylactic acid having an optical purity of 93%, has a crystal fusion heat of 25 J/g and is superior all in heat shrinkage, wrapping test, heat resistance, and elastic modulus.

heat of 2 J/g. In addition, the drawn film of Example 18 was thermally expandable and slightly inferior in wrapping test and heat resistance.

The drawn film of Example 19, which is identical with that of Example 1 except that the polylactic acid in the resin mixture (E) had an optical purity of 98%, had a crystal fusion heat of 33 J/g. In addition, the drawn film of Example 19 was slightly inferior in wrapping test and heat resistance.

The results above indicate that, in the case of preparing a film or sheet by using the resin mixture (E), it is possible to obtain a film or a sheet superior in heat shrinkage, wrapping test, heat resistance and elastic modulus, by using a resin mixture (E) containing a polylactic acid having an optical purity of 90% or more and by annealing the film or sheet.

Table 4 shows that the drawn film of Comparative Example 1, which was prepared by using a resin mixture (F) containing a polylactic acid having an optical purity of 93%, had a crystal fusion heat of 25 J/g but caused thermal expansion and was also inferior in wrapping test.

The drawn film of Comparative Example 7, which is identical with that of Example 1 except that the polylactic acid in the resin mixture (F) has an optical purity of 85%, had a crystal fusion heat of 0 J/g, caused thermal expansion, and inferior in wrapping test and also in heat resistance.

The drawn film of Comparative Example 8, which is identical with that of Example 1 except that the polylactic acid in the resin mixture (F) has an optical purity of 98%, had a crystal fusion heat of 33 J/g and was inferior also in wrapping test.

When the drawn film of Comparative Example 10 prepared by using the resin mixture (F) containing a polylactic acid having an optical purity of 93% by annealing treatment and the same drawn film of Comparative Example 9 prepared without annealing treatment are compared, the drawn film of Comparative Example 9 without annealing treatment showed significant shrinkage by heat, was unsatisfactory in wrapping test and was inferior in heat resistance. The annealed drawn film of Comparative Example 10 did not show heat shrinkage, but was unsatisfactory in wrapping test and inferior also in heat resistance.

The results above indicate that it is not possible, if the polymer according to the present invention is not used, to obtain a film or sheet superior in heat shrinkage, wrapping test, heat resistance and elastic modulus, independently of the optical purity of polylactic acid, presence of annealing treatment, and the crystal fusion heat.

INDUSTRIAL APPLICABILITY

The polymer according to the present invention gives a resin mixture that is effective in softening a polylactic acid resin while preserving the transparency of the polylactic acid resin and simultaneously resistant to bleeding out (extraction) of itself from the polylactic acid resin. Accordingly, the resin mixture can be processed into film, sheet and other various other molded articles. It is usable in various applications, for example, as packaging materials, agriculture, engineering and industrial materials and domestic materials.

What is claimed is:

1. A resin mixture (E) comprising a polymer (C) and a polylactic acid resin (D) at a ratio (C)/(D) of 10/90 to 50/50 (by weight), wherein said polymer (C) comprises an epoxidized vegetable oil segment (A) and a polylactic acid segment (B).

2. The resin mixture (E) according to claim 1, wherein said polylactic acid segment (B) has a number-average molecular weight of 100 or more and 3000 or less.

3. The resin mixture (E) according to claim 1, wherein said epoxidized vegetable oil segment (A) is an epoxidized linseed oil, an epoxidized castor oil or an epoxidized soy bean oil.

4. A film or sheet, prepared by using the resin mixture (E) according to Claim 1.

5. The film or sheet according to claim 4, wherein said film or sheet has a crystal fusion heat of 5 J/g or more and 30 J/g or less.

6. The film or sheet according to claim 4, wherein said film or sheet has a heat shrinkage of 0.1% or more and 15% or less.

7. The resin mixture (E) according to claim 2, wherein said epoxidized vegetable oil segment (A) is an epoxidized linseed oil, an epoxidized castor oil or an epoxidized soy bean oil.

* * * * *